(12) United States Patent
Dishon

(10) Patent No.: US 12,727,663 B2
(45) Date of Patent: Sep. 8, 2026

(54) PRESSURE SENSING SYSTEM AND METHOD FOR AN ELECTRIC TOOTHBRUSH

(71) Applicant: Ranir, LLC, Grand Rapids, MI (US)

(72) Inventor: Bryan J. Dishon, Alto, MI (US)

(73) Assignee: Ranir, LLC, Grand Rapids, MI (US)

( * ) Notice: Subject to any disclaimer, the term of this patent is extended or adjusted under 35 U.S.C. 154(b) by 641 days.

(21) Appl. No.: 18/196,693

(22) Filed: May 12, 2023

(65) Prior Publication Data

US 2024/0374022 A1 Nov. 14, 2024

(51) Int. Cl.
*A46B 15/00* (2006.01)
*A61C 17/34* (2006.01)
*G01L 5/00* (2006.01)

(52) U.S. Cl.
CPC ...... *A46B 15/0012* (2013.01); *A46B 15/0028* (2013.01); *A61C 17/3481* (2013.01); *G01L 5/0028* (2013.01)

(58) Field of Classification Search
CPC ........................ A46B 15/0012; A46B 15/0028
See application file for complete search history.

(56) References Cited

U.S. PATENT DOCUMENTS 5,282,291 A 2/1994 Spieler et al.
5,815,872 A * 10/1998 Meginniss, III ..... A61C 17/222 15/105
6,081,957 A 7/2000 Webb
6,327,734 B1 12/2001 Meginniss, III et al.
6,330,730 B1 12/2001 Davies et al.
6,389,636 B1 5/2002 Savill
6,397,424 B1 6/2002 Leung
6,412,137 B1 7/2002 Heidari
(Continued)

FOREIGN PATENT DOCUMENTS

WO 2019119625 6/2019
WO 2019196644 10/2019
(Continued)

OTHER PUBLICATIONS

Allen C R et al: "Development of a force-sensing toothbrush instrument using pic micro-controller technology for dental hygiene", Mechatronis, Pergamon Press, Oxford, GB, vol. 6, No. 2, Mar. 1, 1996, pp. 125-140.

*Primary Examiner* — Shay Karls
(74) *Attorney, Agent, or Firm* — Warner Norcross + Judd LLP

(57) ABSTRACT

A pressure sensor for a toothbrush. The pressure sensor includes a substrate, a contact arm in the substrate, a power source, a signal element, and a sensor contact. The sensor contact may be mounted to the substrate such that the contact arm is not in contact with the sensor contact when the substrate is not flexed. As a user applies pressure to a toothbrush head, the substrate can flex and move the contact arm toward the sensor contact. When a threshold force is applied to the toothbrush head, the contact arm can contact the sensor contact, completing a circuit between the power source, the sensor contact, and the signal element that activates the signal element. A second sensor contact can be mounted to the substrate opposite the first sensor contact. The second sensor contact can allow the signal element to indicate three different states to a user.

20 Claims, 10 Drawing Sheets

(56) References Cited

U.S. PATENT DOCUMENTS

| | | | | |
|---|---|---|---|---|
| 6,536,068 | B1 | 3/2003 | Yang et al. | |
| 6,739,012 | B2 | 5/2004 | Grez et al. | |
| 6,786,732 | B2 | 9/2004 | Savill et al. | |
| 7,120,960 | B2 | 10/2006 | Hilscher et al. | |
| 7,748,069 | B2 | 7/2010 | Dawley | |
| 8,132,284 | B1 | 3/2012 | Kraemer | |
| 9,113,700 | B2 | 8/2015 | Bates et al. | |
| 9,259,302 | B2 | 2/2016 | Miller | |
| 9,565,927 | B2 | 2/2017 | Bloch et al. | |
| 9,572,419 | B2 | 2/2017 | Bloch et al. | |
| 10,034,730 | B2 | 7/2018 | Skaanland et al. | |
| 10,349,733 | B2 | 7/2019 | Serval et al. | |
| 10,441,393 | B2 | 10/2019 | Miller | |
| 10,524,890 | B2 | 1/2020 | Miller | |
| 10,561,480 | B2 | 2/2020 | Luettgen et al. | |
| 10,621,887 | B2 | 4/2020 | Sullivan | |
| 2010/0325828 | A1* | 12/2010 | Braun ................ | A46B 15/0008<br>15/167.1 |
| 2012/0110763 | A1 | 5/2012 | Jungnickel et al. | |
| 2017/0263149 | A1 | 9/2017 | Sullivan | |
| 2020/0155286 | A1 | 5/2020 | Luettgen et al. | |
| 2020/0315757 | A1 | 10/2020 | Liao | |
| 2021/0030352 | A1 | 2/2021 | Ohmer et al. | |

FOREIGN PATENT DOCUMENTS

| | | |
|---|---|---|
| WO | 2019215321 | 11/2019 |
| WO | 2020144187 | 7/2020 |
| WO | 2021034905 | 2/2021 |
| WO | 2021044129 | 3/2021 |

* cited by examiner 100
110
135
129
106
111
150
130
119
109
116
125
113
140
114
120

100
110
135
129
106
111
130
109
119
125
116
140
113
114
120
F1
AoT1

PRESSURE SENSING SYSTEM AND METHOD FOR AN ELECTRIC TOOTHBRUSH

BACKGROUND OF THE INVENTION

It is known to provide one or more sensing mechanisms in power and manual toothbrushes to determine the pressure applied to the bristle field during brushing. Typically, a sensor of some kind measures the force applied to the bristles. In some cases, the sensor includes a spring, a moment arm, and a switch in which the force applied to the bristle field produces an action on the spring, which in turn drives a moment arm. When the force reaches a threshold or trigger value, a switch is operated, which sends a signal to the user that the force applied has exceeded the threshold level. The user then has the opportunity to reduce the pressure to an acceptable level.

These systems can also be used to ensure that at least a minimum amount of pressure is applied by the user to the bristle field as well. Pressure-sensing systems, however, are often difficult to implement in a typical power or manual toothbrush. Such systems can also add significantly to the overall cost of the toothbrush and often suffer from inaccuracy. A need exists for a compact, simple, and inexpensive pressure-sensing sensor system for a toothbrush.

SUMMARY OF THE INVENTION

The present invention provides a pressure sensing toothbrush that incorporates a contact arm into a substrate, such that flexing of the substrate a threshold amount moves the contact arm into contact with a sensor contact to produce a signal that indicates a threshold amount of force has been applied to the toothbrush cleaning elements.

In one embodiment, the pressure sensing toothbrush includes a toothbrush body, a substrate, a contact arm, a sensor contact, a power source, and a signal element. The toothbrush body can include a handle, a head, and a neck extending between the handle and the head, and the toothbrush body may define an internal cavity. The head may have an upper surface supporting the cleaning elements. The substrate and the power source may be located within the internal cavity. The substrate can define an upper surface, a lower surface opposite the upper surface, a first end closer to the head, and a second end closer to the handle. The substrate may include the contact arm with a contact surface. The sensor contact can be spaced from the contact surface, such that a force on the head can cause the substrate to flex from an unflexed state to a flexed state, which moves the contact surface toward the sensor contact. When the force on the head reaches a predetermined threshold, the substrate is flexed to a threshold flexed state. In the threshold flexed state, the contact surface contacts the sensor contact and completes an electrical connection between the sensor contact, the power source, the contact surface of the contact arm, and the signal element, which activates the signal element.

In one aspect, a second sensor contact can be attached to the substrate opposite the first sensor contact. The contact arm can include a second contact surface aligned with the second sensor contact. In the unflexed state, the second contact surface of the contact arm may contact the second sensor contact and complete an electrical connection between the second sensor contact, the power source, the second contact surface of the contact arm, and the signal element, which activates the signal element to produce a second signal. When a force on the upper surface of the head causes the substrate to flex from an unflexed state to a flexed state, the contact arm may not be in contact with either the first sensor contact or the second sensor contact. When the force on the upper surface of the head causes the substrate to flex to its threshold flexed state, the first contact surface contacts the first sensor contact and completes an electrical connection between the first sensor contact, the power source, the first contact surface of the contact arm, and the signal element, which activates the signal element to produce a first signal.

In one embodiment, the substrate may be a printed circuit board ("PCB"), and the PCB may include a power source, a signal element, and a sensor contact. The PCB may be disposed within the internal cavity of the toothbrush body. The PCB can include a contact arm with a base end connected to the PCB and a free end opposite from the base end. The free end of the contact arm may be unconnected to the remainder of the PCB. The power source may be disposed within the internal cavity of the toothbrush body. The signal element can be mounted to the PCB and connected to the power source. The sensor contact may be mounted on the PCB adjacent to the free end of the contact arm. The PCB can be positioned such that a force on the head of the toothbrush flexes the PCB and moves the contact arm between an unflexed position in which the contact arm is spaced from the sensor contact, and a flexed position in which the contact arm moves toward the sensor contact. When the amount of the force on the head reaches a predetermined threshold, the contact arm is moved to a threshold flexed position in which the contact arm contacts the sensor contact to complete a circuit between the power source and the signal element to activate the signal element.

Figure 1:
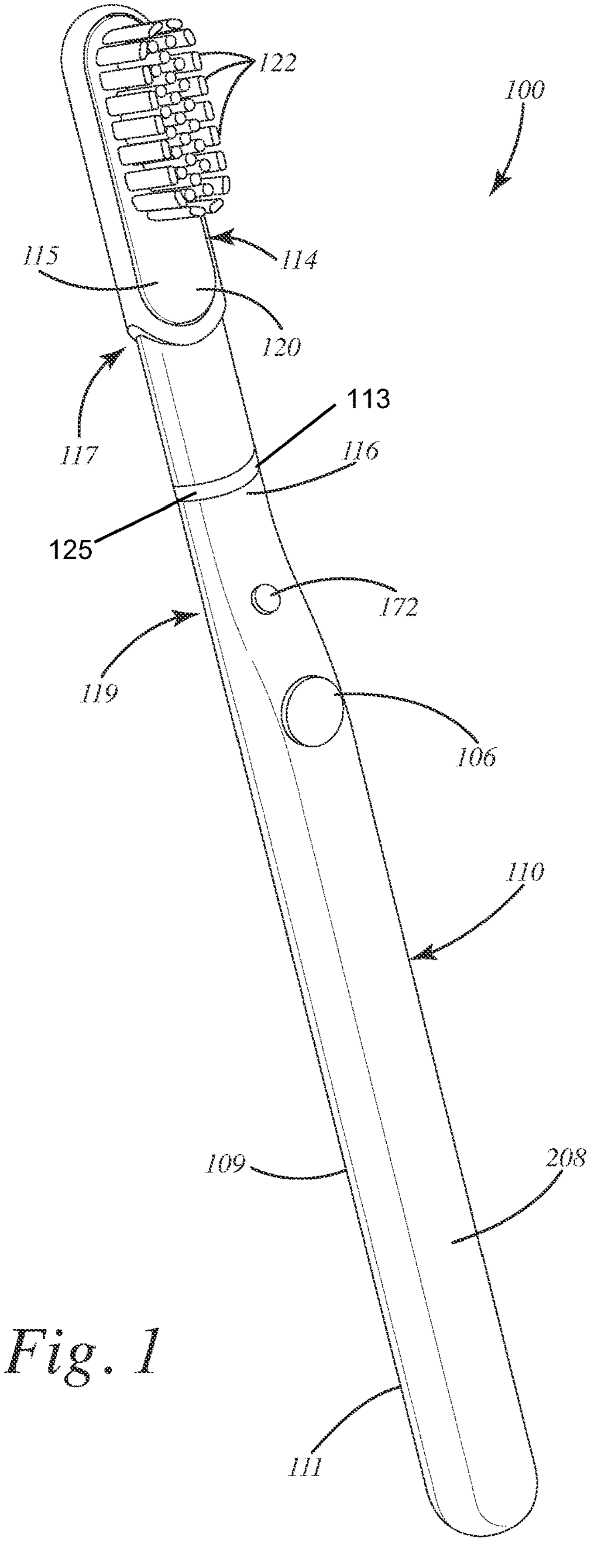
FIG. 1 is a perspective view of a pressure sensing toothbrush according to one embodiment.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DESCRIPTION OF THE CURRENT EMBODIMENTS

Figure 2:
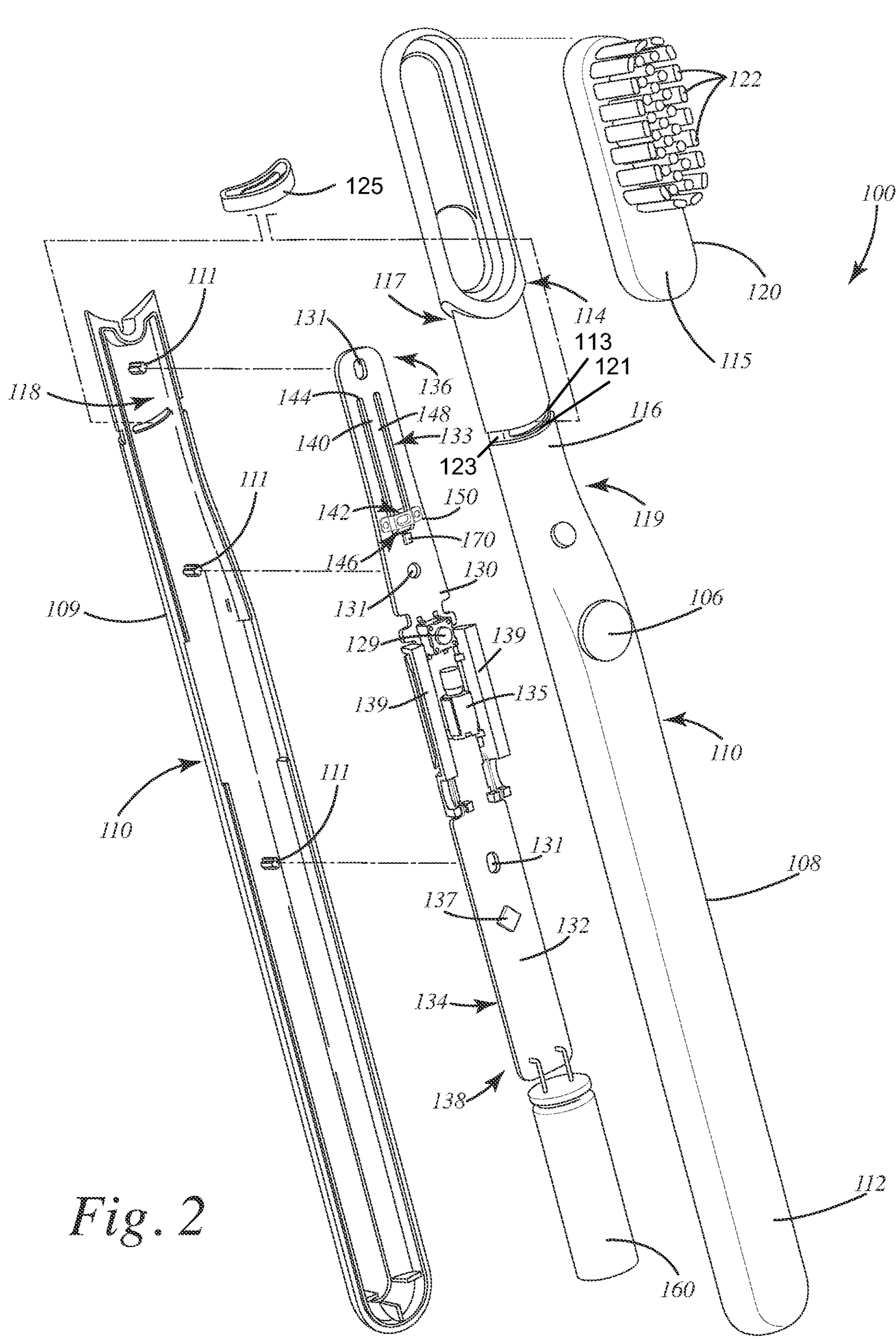
FIG. 2 is an exploded perspective view of the pressure sensing toothbrush of FIG. 1.

The embodiments of the invention described herein relate to a pressure sensing toothbrush 100, which includes a toothbrush body 110 having a handle 112, a head 114, and a neck 116 extending between the handle 112 and the head 114. The neck 116 can have a first end 117 adjacent the head 114, and a second end 119 adjacent the handle 112. The toothbrush body 110 can define an internal cavity 118. Perhaps as best shown in FIG. 2, as depicted, the toothbrush body 110 can include an upper portion 108 and a lower portion 109 that join together to form the internal cavity 118. In another aspect, the toothbrush body 110 may form the internal cavity 118 through any other suitable structure.

The head 114 can have an upper surface 120 supporting a plurality of cleaning elements 122. As depicted, the plurality of cleaning elements 122 are arranged in a stadium shape and include cleaning elements 122 of two different shapes. In another aspect, the plurality of cleaning elements 122 may be arranged in a different shape and/or a different pattern. In one aspect, the plurality of cleaning elements 122 may include cleaning elements 122 of one shape. In one aspect, the plurality of cleaning elements 122 can include cleaning elements 122 of three or more distinct shapes. As depicted in FIG. 2, the head 114 includes a removable head 115. In another aspect, the entirety of the head 114 may be unitary and fixedly connected to the neck 116. As depicted, the toothbrush 100 is a vibratory electric toothbrush. In an alternate aspect, the toothbrush 100 can be a manual toothbrush, or a different style of electric toothbrush, such as one that produces rotation of the head or cleaning elements.

In one embodiment, the toothbrush body 110 may include a flex section 113 formed on the body 110 to provide a section or line about which the toothbrush body 110 has an increased degree of flexibility about a line extending perpendicular to the longitudinal axis of the toothbrush 100. Referring to FIGS. 1-4, the flex section 113 may be positioned in the neck 116 to provide a degree of flexibility in the neck 116. As illustrated, the flex section 113 is formed by opposing openings 121 defined in the toothbrush body 110, and forming a pair of opposing bridges 123 extending longitudinally on either side of the openings 121. The removal of material within the openings 121 increases the flexibility of the neck 116 in the area of the flex section 113 by flexing of the bridges 123 when a force is placed on the brush head 114. As also shown in FIGS. 1-4, the flex section 113 may include a flex ring 125 extending around the neck 116 within the flex section 113 to cover the openings 121. The flex ring 125 may be formed from a flexible material, such as a thermoplastic elastomer, which can be attached to or molded over the toothbrush body 110 in the flex section 113 to maintain the flexibility of the flex section 113.

A substrate 130 can be located within the internal cavity 118. In one aspect, the substrate 130 is a relatively flat strip of material, and in the illustrated embodiment the substrate is a printed circuit board ("PCB"). The substrate 130 may define an upper surface 132 and a lower surface 134 opposite the upper surface 132. The substrate 130 can include a first end 136 and a second end 138. The first end 136 may be closer to the head 114 and the second end 138 may be closer to the handle 112. In one embodiment, the substrate 130 can include one or more apertures 131 configured to align with one or more heat stake bosses 111 in the lower portion 109 of the toothbrush body 110. These apertures 131 may include a locating mounting hole and one or more mounting slots. The apertures 131 may all be the same shape, or vary in shape. The heat stake bosses 111 may be melted to secure the substrate 130 to the to the lower portion 109 of the housing 110. In another embodiment, the PCB does not include the mounting holes 131 and alternatively may be located and secured to a portion of the toothbrush body 110 by another method.

The substrate 130 can include, or be electrically connected to, a power source 160. The power source 160 may be used to power various functionality of the toothbrush 100. In one aspect, the power source 160 can be used to power a signaling functionality of the toothbrush 100 through a signal element 170, as described in more detail below. The power source 160 may be any suitable power source, such as a battery. In one aspect, the power source 160 can be included in the internal cavity 118 without being secured to the substrate 130. In one aspect, the power source 160 may power the pressure sensor and a second power source may power the other toothbrush functions. The substrate 130 can include a controller 137 to control the functionality of the pressure sensor. The controller 137 may include one or more microcontrollers. The controller 137 can include more than one controller located in various locations in the internal cavity 118. The controller 137 can be mounted to the upper surface 132 of the PCB 130, and the controller may include its own PCB and one or more electronic components. The controller 137 may be directly or indirectly electrically connected to the power source 160. The controller 137 can be electrically connected to a sensor contact 150, a contact surface 142, and the signal element 170, discussed in more detail below. In one aspect, the input of the controller 137 can be driven high with a resistor connected to the power source 160.

The substrate 130 may include a tactile switch or TAC switch 129 mounted to the substrate and electrically connected to the power source 160. The TAC switch 129 can be positioned underneath a power button 106 on the upper portion 108 of the toothbrush body 110. The power button 106 may be formed from a thermoplastic elastomer, or another flexible material, such that a user can press the power button 106 to activate the TAC switch 129, which can turn functions of the toothbrush 100 on or off depending on the current state of the toothbrush 100. The substrate 130 can include an induction coil subassembly 139 configured to wirelessly couple to a charger to charge the power source 160. In one aspect, the toothbrush 100 may charge by coupling to a charger plugged into a wall outlet. The charger and the toothbrush body 110 may each include a magnet to assist in removably coupling the toothbrush 100 to the charger through magnetic attraction.

Figures 3, 4:
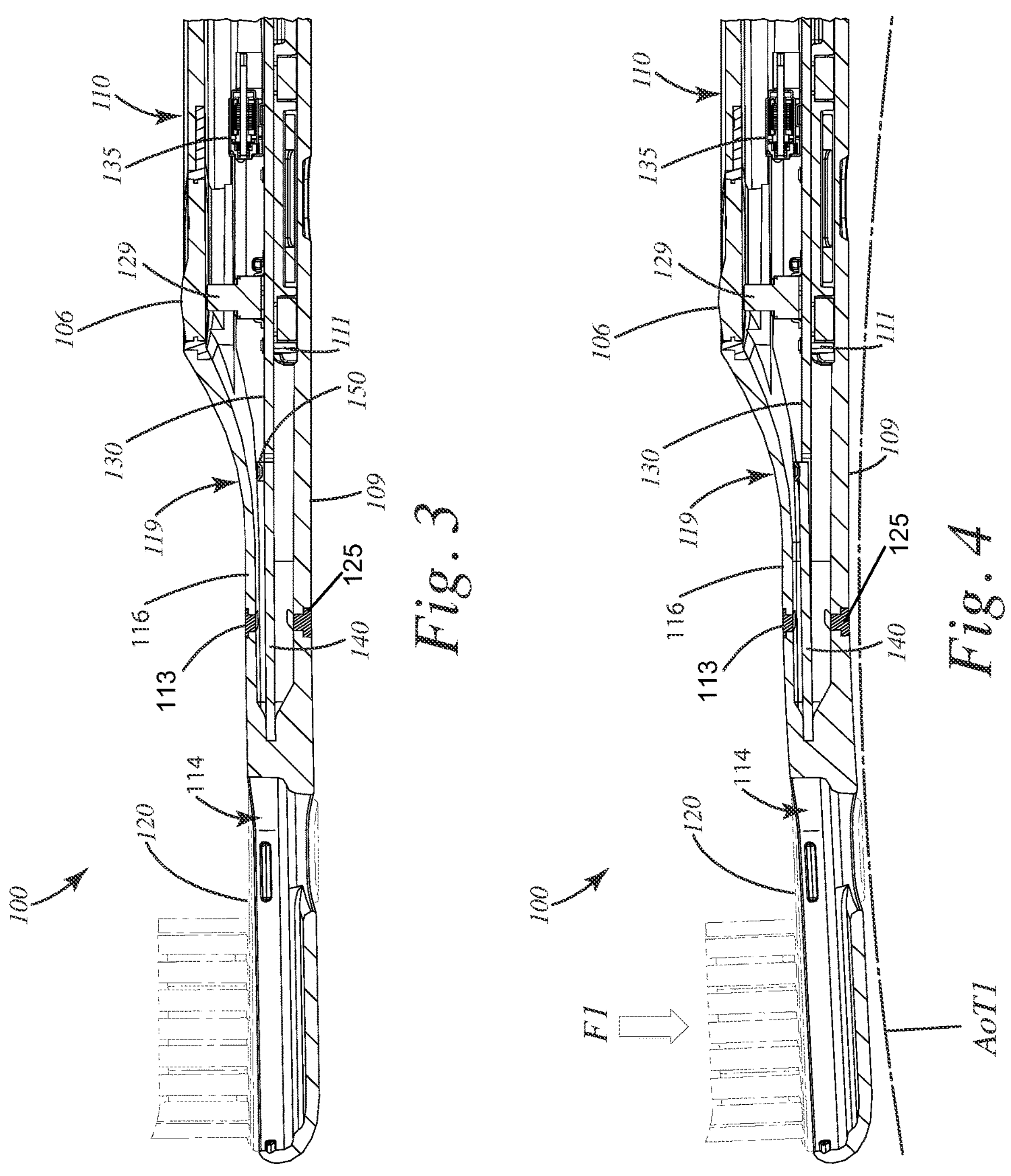
FIG. 3 is a side cross sectional view of a portion of the pressure sensing toothbrush.
FIG. 4 is a side cross sectional view of the portion of the pressure sensing toothbrush with a threshold force applied to the toothbrush head.

The substrate 130 can include a contact arm 140. The contact arm 140 may alternately be referred to as a sensor moment arm. The contact arm 140 may have a contact surface 142. As depicted, the contact surface 142 is located near the free end 146 of the contact arm 140. In one aspect, the contact surface 142 may be a plated contact pad. In one aspect, the contact surface 142 can include a copper trace connected to a ground on the substrate 130. Perhaps as best shown in FIGS. 2-4, as depicted, the contact arm 140 is located in the neck 116 of the toothbrush body 110 with a portion of the contact arm aligned within the flex section 113. In another embodiment, the contact arm 140 may be placed at essentially any location along the substrate 130, but the threshold force (described in more detail below) is higher the further away from the head 114 the contact arm 140 is located. In one aspect, the contact arm 140 can be formed as a unitary piece with the substrate 130. As depicted, the contact arm 140 is cantilevered to the substrate 130. The contact arm 140 can have a base end 144 attached to the substrate 130 and a free end 146 opposite from the base end 144 and spaced from the remainder of the substrate 130. Put another way, the free end 146 may not be in contact with the rest of the substrate 130. As depicted, the contact arm 140 is centrally disposed within an opening 133 defined in the substrate 130 with the contact surface 142 being coplanar with the upper surface 132 of the substrate 130 when the contact arm 140 is in the unflexed state. In another aspect, the contact arm 140 may be off center within the opening 133. In one aspect, the base end 144 of the contact arm 140 can be adjacent the first end 117 of the neck 116 of the toothbrush 100, and the free end 146 of the contact arm 140 can be adjacent the second end 119 of the neck 116. In one aspect, the contact arm 140 may be formed by machining the substrate 130.

A sensor contact 150 may be spaced from the contact surface 142 of the contact arm 140. The substrate 130, contact arm 140, power source 160, signal element 170, and sensor contact 150 together may be referred to as a pressure sensor. As depicted, the sensor contact 150 is mounted to the upper surface 132 of the substrate 130 above the free end 146 of the contact arm 140, and therefore above the contact surface 142. Put another way, the sensor contact 150 can be positioned adjacent to the free end 146 of the contact arm 140. In one aspect, the sensor contact 150 may be mounted below the free end of the contact arm 140. In another aspect, two sensor contacts 150 may be used and a sensor contact 150 may be mounted above and below the free end of the contact arm 140, as described in more detail below with reference to FIGS. 8-13. In one aspect, the sensor contact 150 can be made from stamped metal that is plated, and the sensor contact 150 can be attached to the substrate with fasteners, an adhesive, or another attachment method. The sensor contact 150 can be electrically connected to the controller 137, the power source 160, and the signal element 170, for example via copper trace.

The toothbrush 100 may include the signal element 170 configured to indicate an amount of force on the toothbrush 100 to a user. More specifically, the signal element 170 can be configured to indicate an amount of force on the toothbrush head 114 to the user. Put another way, the signal element 170 can alert a user to the pressure state of the toothbrush 100. As depicted, the signal element 170 is mounted to the substrate 130. In another aspect, the signal element 170 may be electrically connected to the substrate 130 but not physically connected to the substrate 130. As depicted, the signal element 170 can be viewed external to the toothbrush body 110 through a cover 172. In one aspect, the cover 172 may be part of the signal element 170. In one aspect, the signal element 170 may be an LED that is visible from the exterior of the toothbrush body 110. In another aspect, the signal element 170 can be a speaker that emits an audible signal that can be heard from the exterior of the toothbrush body 110. The signal element 170 may also vibrate or emit another tactile signal that the user can feel when the signal element 170 is triggered. In one embodiment, the toothbrush 100 may include multiple signal elements 170, such as an LED and a speaker, mounted to the substrate 130 or electrically connected to the substrate 130.

Figure 5:
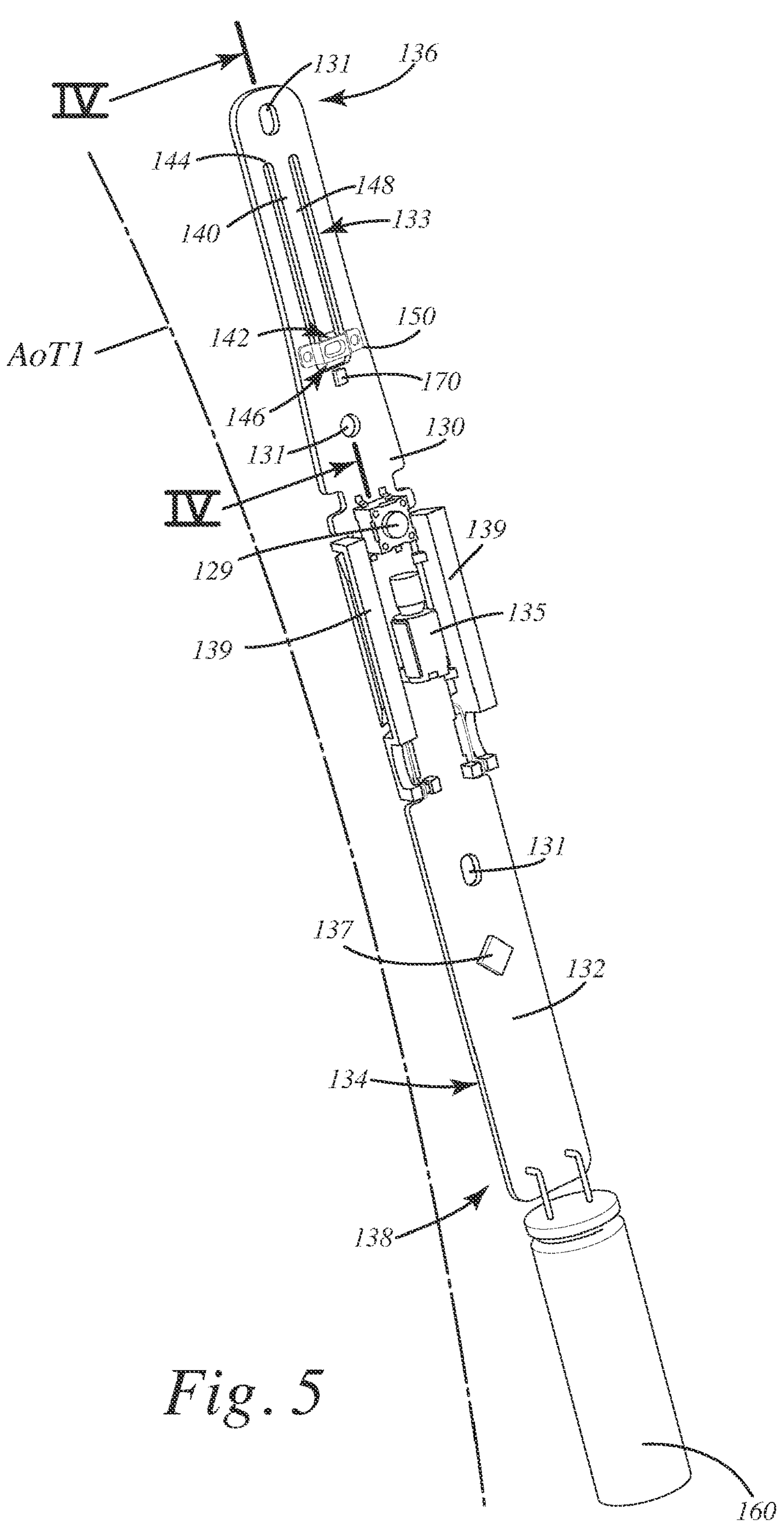
FIG. 5 is a perspective view of a substrate of the pressure sensing toothbrush of FIG. 1.
Figure 6:
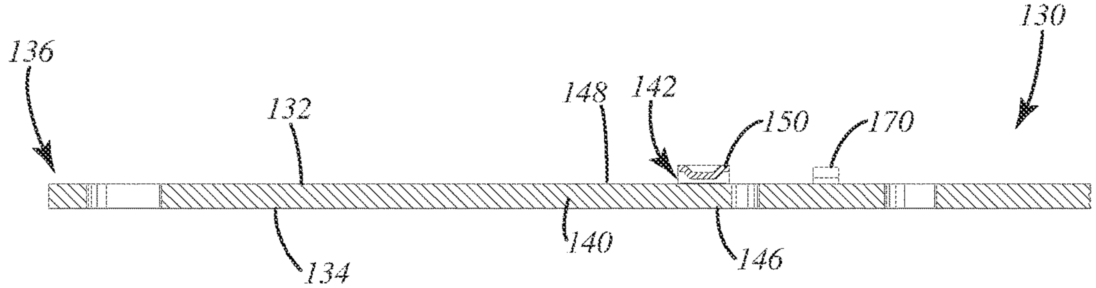
FIG. 6 is a sectional view along the line IV-IV of the substrate of FIG. 5.
Figure 7:
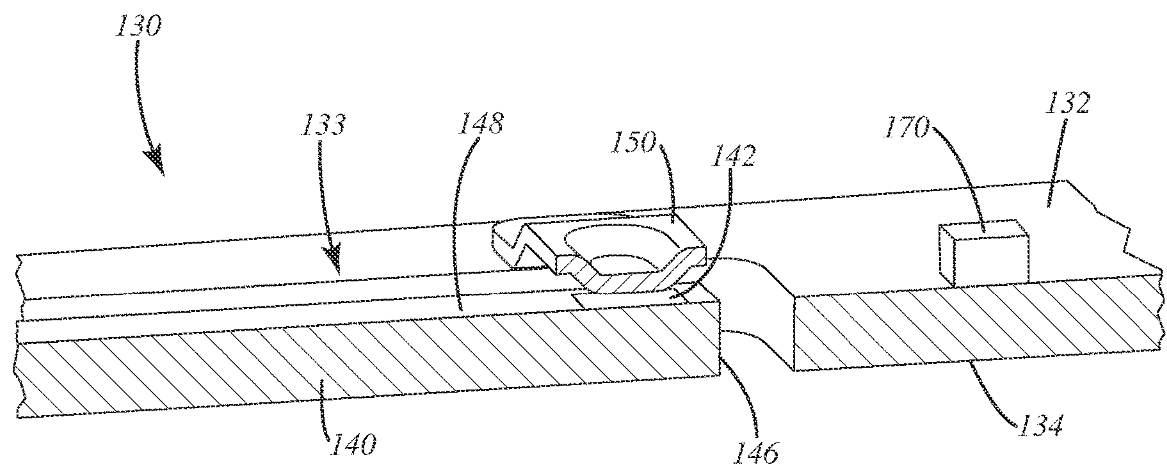
FIG. 7 is a close-up of the substrate of FIG. 6.
Figure 8:
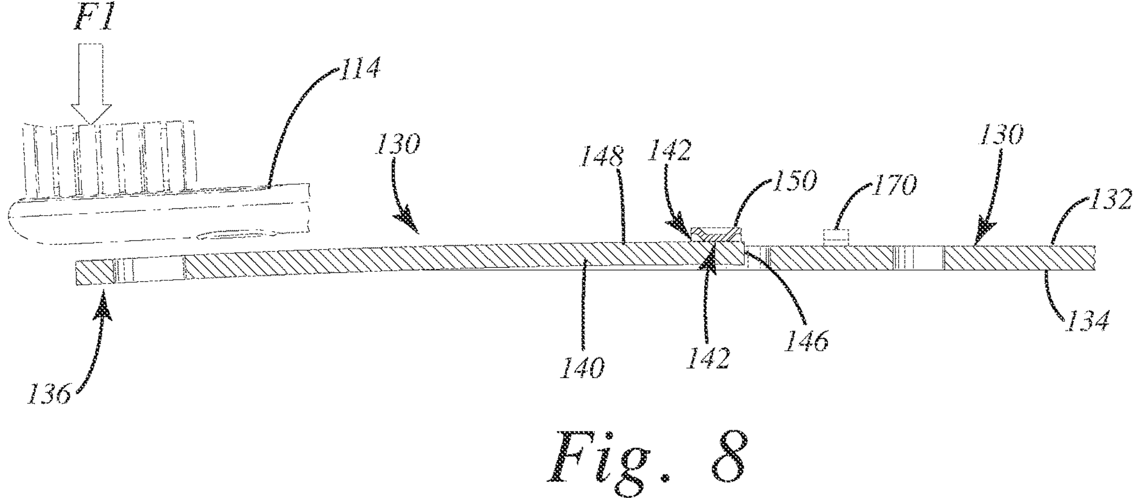
FIG. 8 is a representational view of the pressure sensing toothbrush of FIG. 1 with a threshold force applied to a toothbrush head.

As depicted in FIGS. 5 and 8, a force F1 on the head 114 may cause the substrate 130 to flex along a flexed axis or arc of travel AoT1. The substrate 130 can flex from an unflexed state (as shown in FIG. 5) to a flexed state. The degree of flex may be increased by the flex section 113, and may be controlled by the size of the openings 121 within the flex section 113 and the flexibility of the material used for the flex ring 125. As illustrated, an upper surface 148 of the contact arm 140 is coplanar with the upper surface 132 of the substrate 130 when the substrate 130 is in the unflexed state. As the substrate 130 flexes, the contact surface 142 of the contact arm 140 moves toward the sensor contact 150. In this state, the substrate 130 is in a flexed position in which the contact arm 140 is moved from its unflexed position, but is not in contact with the sensor contact 150. The amount of force on the toothbrush 100 in the flexed position is within the normal range of force for toothbrushing.

Figure 9:
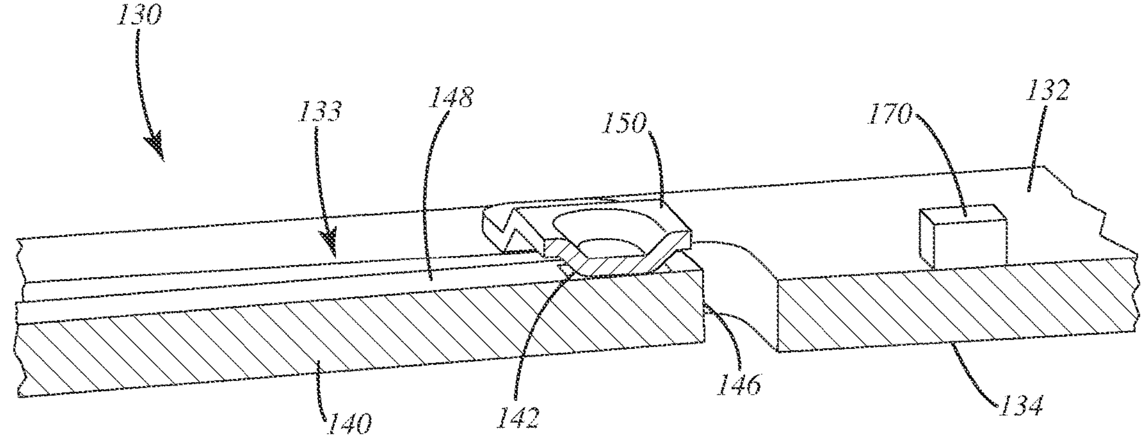
FIG. 9 is a close-up perspective view of the substrate of FIG. 8.

When the amount of force F1 reaches a predetermined threshold, the substrate 130 is flexed to a threshold flexed state or a threshold flexed position (as shown in FIGS. 8-9). The threshold flexed state can be predetermined based on the flexibility of the substrate 130 to indicate that the amount of force being applied to the toothbrush 100 has reached a threshold amount and is thus excessive or high. In one aspect, the predetermined amount of threshold force F1 required to move the substrate 130 to the threshold flexed state is 250 g (g-force). In the threshold flexed state, the contact surface 142 contacts the sensor contact 150 and completes an electrical connection between the sensor contact 150, the power source 160, the contact surface 142 of the contact arm 140, and the signal element 170, thereby activating the signal element 170. The activation of the signal element 170 can indicate to a user that too much force is being applied to the toothbrush 100. Put another way, the free end 146 of the contact arm 140 can be spaced from the sensor contact 150 when the substrate 130 is in either the unflexed state or the flexed state, and the free end 146 of the contact arm 140 can contact the sensor contact 150 when the substrate 130 is in the threshold flexed state.

For example, when the signal element 170 is an LED, the LED may be lit with a first color when the substrate 130 is in the unflexed position and the LED may be lit to a second color when the substrate 130 is flexed to the threshold flexed position. In another aspect, the LED can be unlit when the substrate 130 is in the unflexed position and the LED can be lit to a first color when the substrate 130 is flexed to the threshold flexed position. In another aspect, the LED may be lit with a first color when the substrate 130 is in the unflexed position and the LED may be unlit when the substrate 130 is flexed to the threshold position.

As shown in FIG. 2, in one aspect, the toothbrush 100 can include a haptic motor 135 coupled to the substrate 130. The haptic motor 135 may be used to vibrate the head 114 in an electric toothbrush. In one aspect, the haptic motor 135 can be the signal element 170 and provide a vibration signal to a user. For example, the haptic motor 135 can vibrate the toothbrush 100 more intensely, in a different pattern, or in any other way to indicate to a user that the substrate 130 is flexed to the threshold position and therefore the force F1 on the toothbrush 100 is too high.

In one aspect, when the contact arm 140 contacts the sensor contact 150 the input signal of the controller 137 is driven low, and the controller software signals the signal element 170 to indicate the threshold flexed state. In one example, the controller softer may change the LED color and pulse the haptic motor to alert the user of high-pressure state. When pressure is reduced and contact between the contact arm 140 and the sensor contact 150 is broken, the input signal of the controller 137 is driven high again signaling correct pressure state. The controller software can signal the signal element 170 to stop indicating the threshold flexed state.

Figure 10:
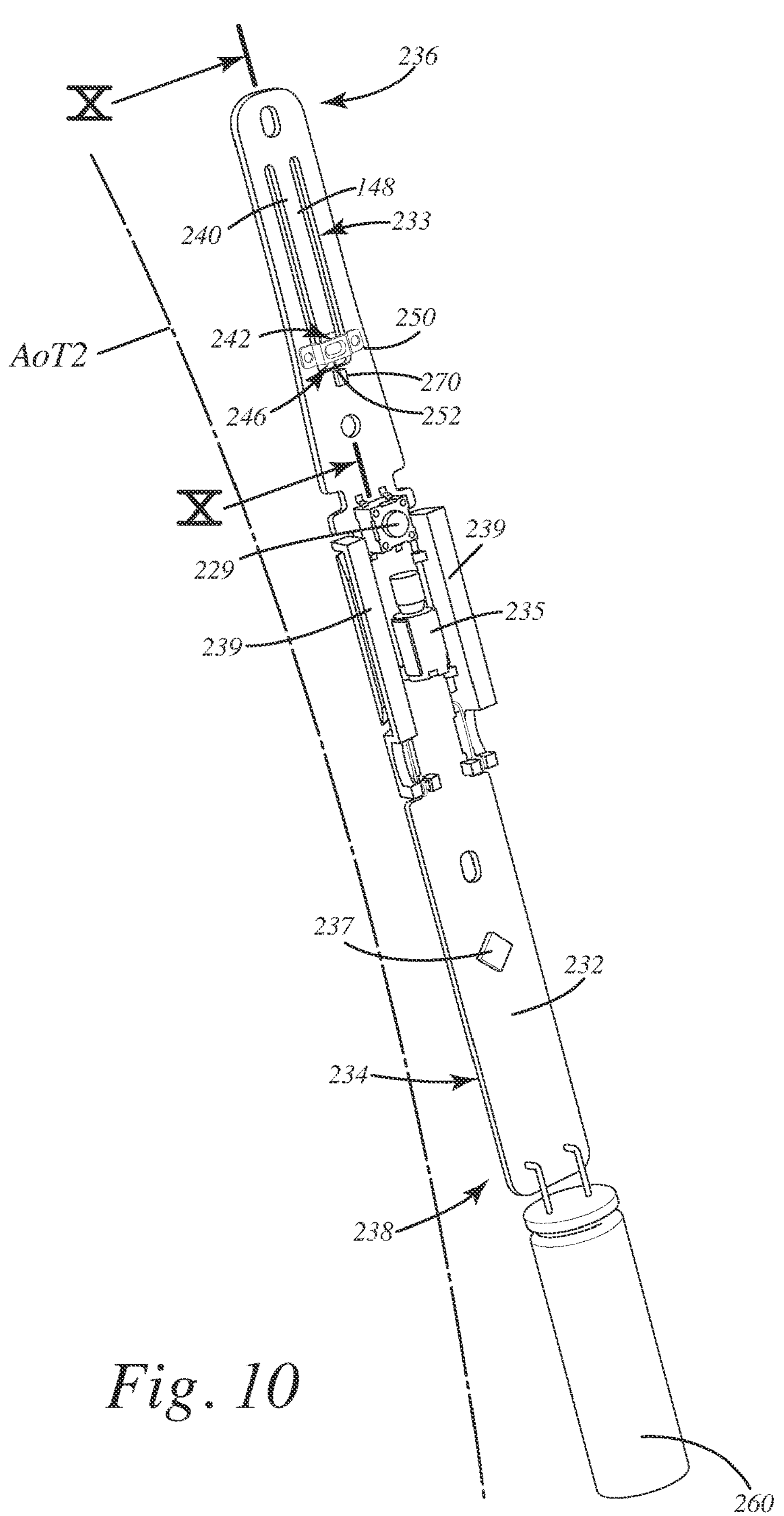
FIG. 10 is a top perspective view of a substrate of a pressure sensing toothbrush according to another embodiment.
Figure 11:
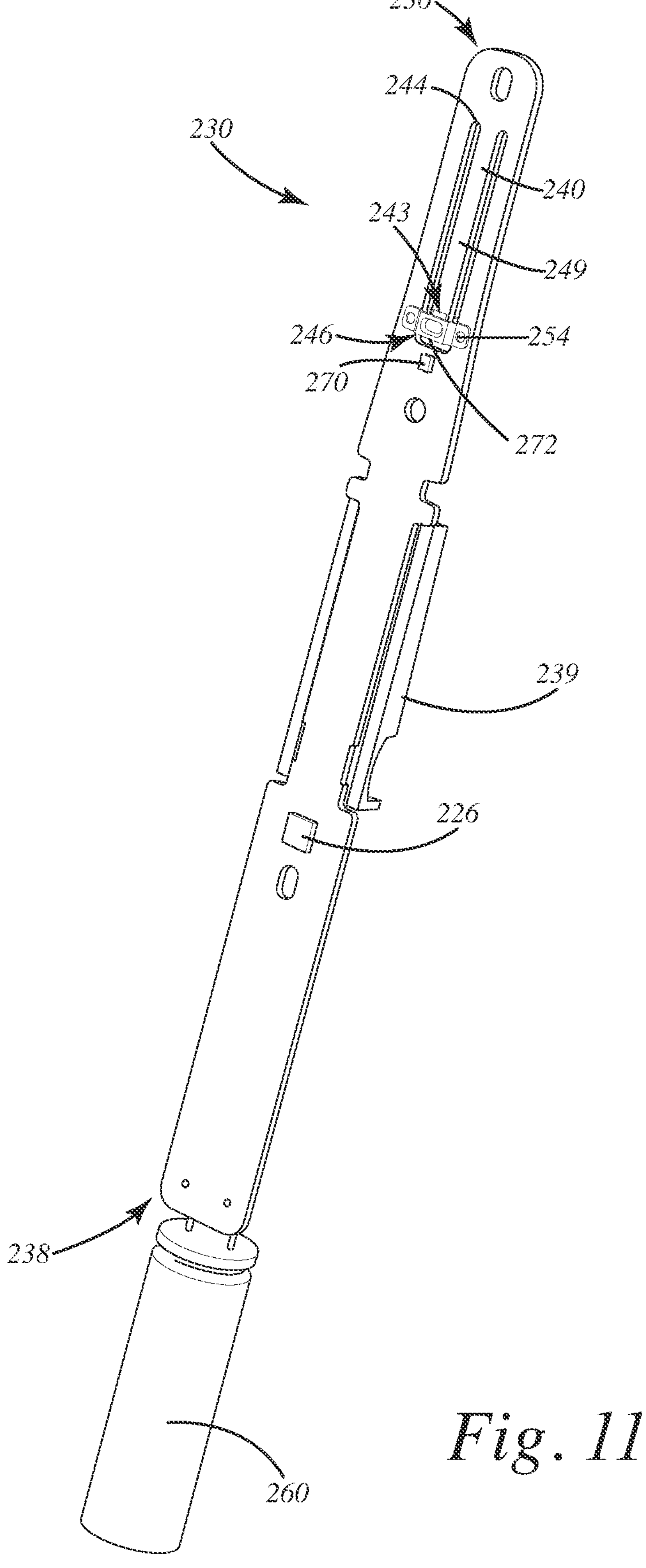
FIG. 11 is a bottom perspective view of the substrate of FIG. 10.

FIG. 10 depicts a top perspective view of an alternative embodiment for the toothbrush 100. In this embodiment, the substrate 230 is similar to the substrate 130 discussed with respect to FIGS. 2-9 with like components except in the aspects outlined below. Components that are consistent across the two aspects are labelled with the same number as in FIGS. 2-7 with a leading “2” instead of a leading “1”. FIG. 11 depicts a bottom perspective view of the substrate 230 of FIG. 10.

The substrate 230 may flex along the arc of travel AoT2. As shown in FIGS. 10-11, the substrate 230 includes a first sensor contact 252 mounted above the free end 246 of the contact arm 240 and a second sensor contact 254 mounted below the free end 246 of the contact arm 240. In this aspect, the substrate 230, contact arm 240, power source 260, signal element 270, the first sensor contact 252, and the second sensor contact 254 together may be referred to as a pressure sensor. Both the first sensor contact 252 and the second sensor contact 254 are mounted to the substrate 230 and are electrically connected to the signal element 270. The contact arm 240 can have two contact surfaces: a first contact surface 242 on the upper surface 248 of the contact arm 240 and a second contact surface 243 on the lower surface 249 of the contact arm 240. The first contact surface 242 may be aligned to contact the first sensor contact 252 and the second contact surface 243 may be aligned to contact the second sensor contact 254 as the substrate 230 flexes.

Figure 12:
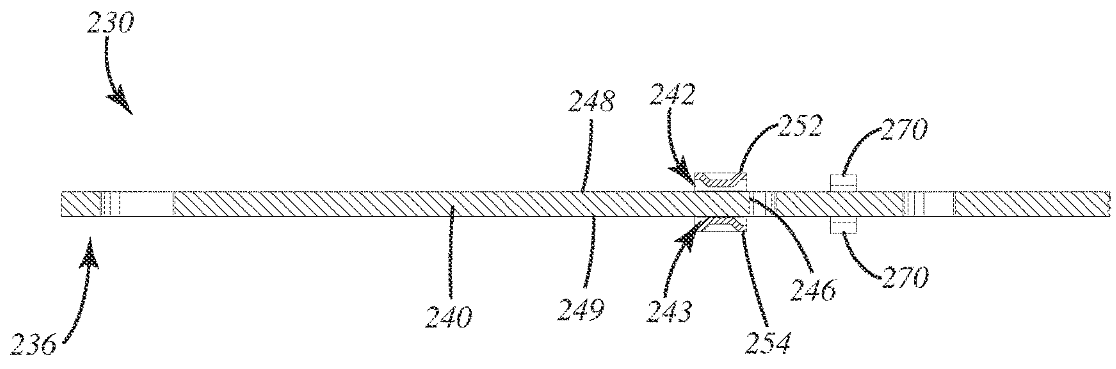
FIG. 12 is a sectional view of the substrate of FIG. 10 along the line X-X.
Figure 13:
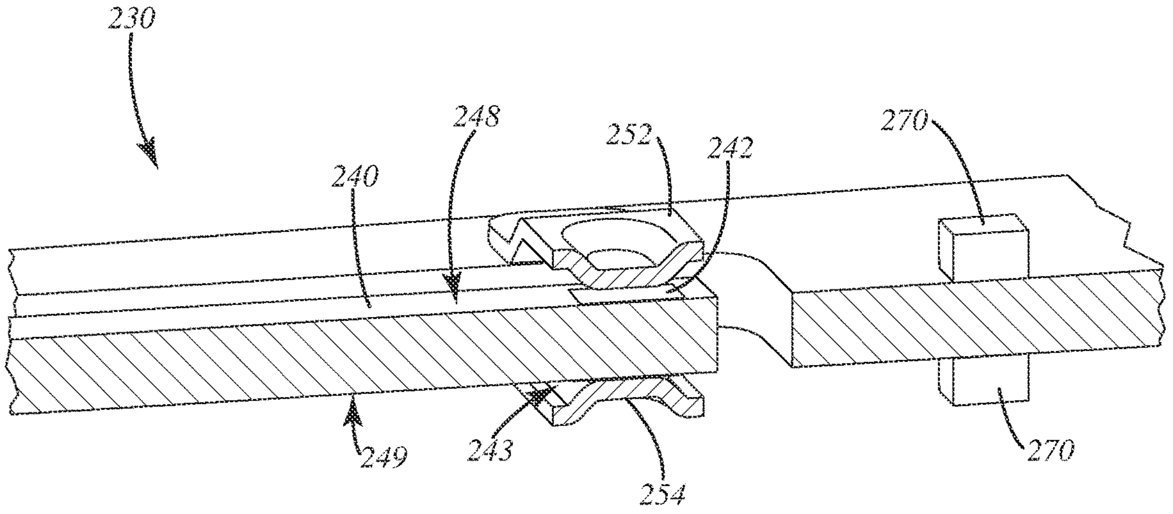
FIG. 13 is a close-up perspective view of the substrate of FIG. 12.
Figure 14:
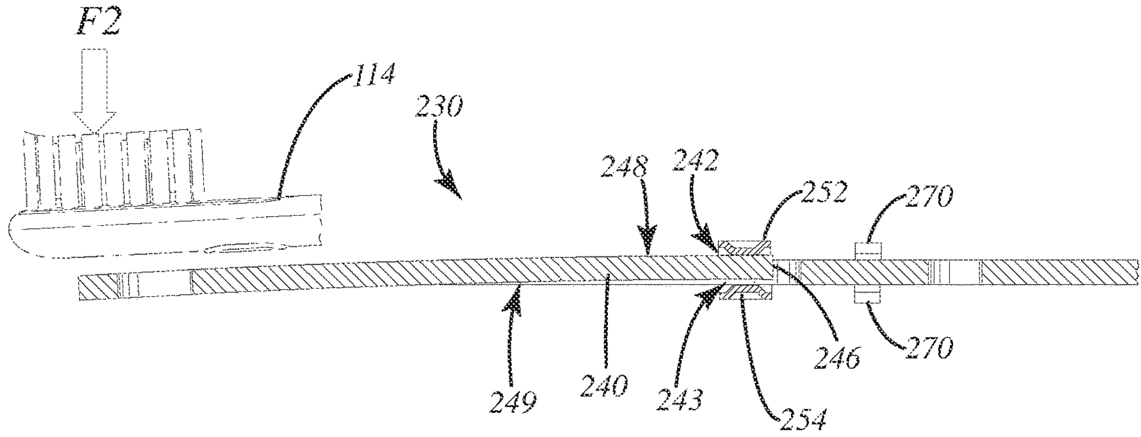
FIG. 14 is a representational view of a pressure sensing toothbrush including the substrate of FIG. 10 with a threshold force applied to the toothbrush head.
Figure 15:
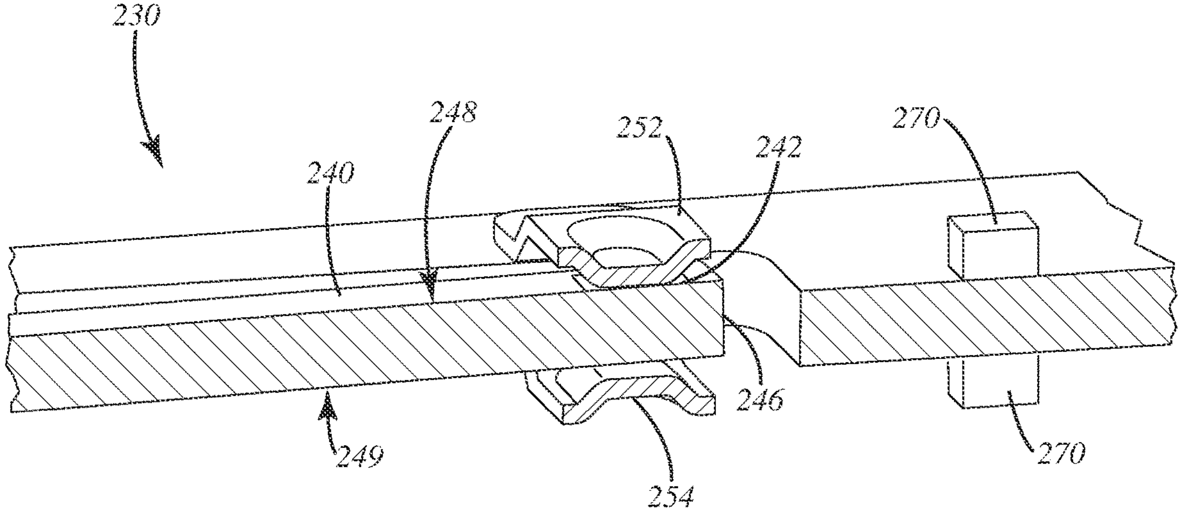
FIG. 15 is a close-up perspective view of the substrate of FIG. 14.

As shown in FIGS. 12 and 13, the second contact surface 243 can contact the second sensor contact 254 when the substrate 230 is in the unflexed state. This can complete an electrical connection between the second sensor contact 254, the power source 260, the second contact surface 243 of the contact arm 240, and the signal element 270, thereby activating the signal element 270. When the substrate 230 is in a flexed state but has not reached the threshold flexed state, the contact arm 240 may not be in contact with either the first sensor contact 252 or the second sensor contact 254. As shown in FIGS. 14 and 15, the first contact surface 242 can contact the first sensor contact 252 when the substrate 230 is in the threshold flexed state, thereby completing an electrical connection between the first sensor contact 252, the power source 260, the first contact surface 242 of the contact arm 240, and the signal element 270, and activating the signal element 270. Put another way, the first contact surface 242 can contact the first sensor contact 252 when the force F2 on the brush head 114 reaches a threshold force. The signal element 270 can be configured to produce a first signal when the contact arm 240 contacts the second sensor contact 254, a second signal when the contact arm 240 is not in contact with either of the sensor contacts 250, and a third signal when the contact arm 240 is in contact with the first sensor contact 252 (put another way, when the substrate 230 is in the threshold flexed state). For example, in one aspect where the signal element 270 is an LED, the LED may flash a first color when the contact arm 240 contacts the second sensor contact 254, a second color when the contact arm 240 is not in contact with either of the sensor contacts 250, and a third color when the contact arm 240 is in contact with the first sensor contact 252.

Operation of the toothbrush 100 generally begins with a user picking up the toothbrush 100 and pressing the power button 106 to in turn press the TAC switch 129. Depending on the programming of the controller 137, the pressing of the TAC switch may initiate one or more functions of the toothbrush. In one embodiment, the pressing of the TAC switch actuates the haptic motor 135 to begin vibrating the toothbrush 100. The haptic motor 135 may be programmed to operate for a set period of time, or may otherwise be programmed to operate until a subsequent pressing of the power button 106. The pressing of the power button 106 may also activate the pressure sensor. In one embodiment, the LED 170 or other signal device may remain off upon the initial pressing of the power button 106. In another embodiment, the initial pressing of the power button may turn on the LED 170 to indicate an “ON” state of the toothbrush 100.

Further operation of the toothbrush 100 includes the user initiating brushing by pressing the cleaning elements 122 against the user’s teeth and brushing. As the user brushes, the force F1 on the head 114 and the cleaning elements 122 causes the substrate 130 within the internal cavity 118 to begin to flex, generally in the direction of the curve AoT1 shown in FIG. 3. As the user brushes within an acceptable range of force F1 on the cleaning elements 122, the substrate 130 remains in a flexed state wherein the free end 146 of the contact arm 140 is flexed but is not in contact with the sensor contact 150. In this flexed state, the LED 170 generally remains in the same state as it was upon the initial pressing of the power button 106. For example, if the LED 170 remains off upon an initial pressing of the power button 106, then the LED 170 may remain off while the brush is in use and the substrate 130 is in the flexed state, and if the LED 170 was turned on by the initial pressing of the power button 106, then the LED may remain on while the substrate is in the flexed state.

If the force F1 on the head 114 or cleaning elements 122 exceeds the predetermined threshold, such as 250 g, then the contact arm 140 will be further flexed away from the surface of the substrate 130 and into a threshold flexed position in which the contact arm 140 abuts and is in electrical contact with the contact sensor 150. When such electrical contact is made, the controller 137 may operate the LED 170 to change states to indicate that the user has exceeded the desired brushing force and should reduce force on the brush head 114. In an embodiment where the LED 170 was off while the substrate 130 was in the flexed position, then the LED 170 may turn on when the substrate reaches the threshold flexed position. In an embodiment where the LED 170 was on when the substrate was in the flexed position, the LED 170 may change colors when the substrate 130 reaches the threshold flexed position. Additional signals, such as an audio or haptic signal, may also be actuated when the substrate 130 reaches the threshold flexed position. Finally, when a user reduces the force F1 back below the threshold force, the substrate 130 will unflex back to the flexed state, with the contact arm 140 no longer contacting the contact sensor 150, and the excess force LED 170 and other signals will cease.

Operation of the toothbrush embodiment shown in FIGS. 10-15, including the substrate 230, may vary from the operation of toothbrush 100. In particular, the addition of a second sensor contact 254 positioned above a second contact surface 243 on the contact arm 240 enables the toothbrush to signal an unflexed state, a flexed state, and a threshold flexed state. In this embodiment, the second contact surface 243 contacts the second sensor contact 254 when the substrate 230 is in the unflexed state. As a result, upon the user pressing the switch 229, the toothbrush may be programmed to activate the signal LED 270 to indicate a "ready" or "insufficient force" status of the toothbrush. For example, upon pressing the switch 229, the LED 270 may be lit with a first color.

As a user begins brushing with the toothbrush having substrate 230, the force F2 on the brush head 114 causes the substrate 230 to flex along the arc AoT2 into a flexed state. In this state, the free end 246 of the contact arm 240 separates from the second sensor contact 254 and moves closer to the first sensor contact 252 without contacting the first sensor contact 252. In this flexed state, wherein the contact arm 240 does not contact either of the sensor contacts 252, 254, the toothbrush may be programmed to active the LED 270 to indicate a "proper brushing force" state by changing the color of the LED to a second color. The LED 270 may remain in this color for as long as the substrate 230 remains in the flexed state.

Finally, in the event that the force F2 increases to a degree that the contact surface 242 of the contact arm 240 contacts the first sensor contact 252, the substrate 230 is additionally flexed into a threshold flexed state. In this threshold flexed state, the electrical connection between the contact surface 242 and the sensor contact 252 may cause the LED 270 to change to a third color to indicate an "excessive force" in a manner similar to the first embodiment. Additional signal indicators, such as audio signals and haptic signals, may be used to indicate one or more of the unflexed state, the flexed state and the threshold flexed state.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The invention claimed is:

1. A pressure sensing toothbrush, comprising:

a toothbrush body having a handle, a head, and a neck extending between the handle and the head, the head having an upper surface supporting a plurality of cleaning elements, the toothbrush body defining an internal cavity;

a substrate within the internal cavity, the substrate defining an upper surface and a lower surface opposite the upper surface, a first end and a second end, wherein the first end is closer to the head and the second end is closer to the handle, the substrate including a contact arm extending from the substrate, the contact arm having a contact surface;

a sensor contact spaced from the contact surface of the contact arm;

a power source within the internal cavity; and a signal element on the toothbrush body;

wherein a force on the upper surface of the head causes the substrate to flex from an unflexed state to a flexed state, and wherein the flexing of the substrate to the flexed state moves the contact surface of the contact arm toward the sensor contact, and upon the amount of the force reaching a predetermined threshold, the substrate is flexed to a threshold flexed state, wherein the contact surface contacts the sensor contact and completes an electrical connection between the sensor contact, the power source, the contact surface of the contact arm, and the signal element, thereby activating the signal element;

wherein the contact arm has a free end separated from the remainder of the substrate, the free end positioned adjacent to the sensor contact, wherein the free end is spaced from the sensor contact with the substrate in the unflexed state, and wherein the free end is flexed away from the remainder of the substrate to contact the sensor contact when the substrate is in the threshold flexed state.

2. The pressure sensing toothbrush of claim 1, wherein the substrate is a printed circuit board, the contact arm formed as a unitary piece with the circuit board, the power source, sensor contact, and the signal element being mounted to the circuit board.

3. The pressure sensing toothbrush of claim 2 wherein the contact arm is cantilevered to the substrate, the contact arm having a base end attached to the substrate and the free end opposite from the base end and spaced from the remainder of the substrate.

4. The pressure sensing toothbrush of claim 1 including a second sensor contact, the second sensor contact contacting the contact arm when the substrate is in the unflexed state, and the second sensor not contacting the contact arm when the substrate is in the flexed state, the signal element activated to produce a first signal when the contact arm contacts the second sensor contact, the signal element activated to produce a second signal when the contact arm is not in contact with either of the sensor contacts, and the signal element activated to produce a third signal when the substrate is in the threshold flexed state with the contact arm in contact with the sensor contact.

5. The pressure sensing toothbrush of claim 1 further comprising:

a haptic motor electrically connected to the power source, the haptic motor configured to vibrate the toothbrush, wherein the haptic motor provides a vibration signal to a user when the substrate is in the threshold flexed state.

6. The pressure sensing toothbrush of claim 1 wherein the contact arm is formed by machining the substrate.

7. The pressure sensing toothbrush of claim 1 wherein the signal element is a speaker, wherein the speaker is configured to emit an audible signal when the substrate is in the threshold flexed state.

8. A pressure sensing toothbrush, comprising: a toothbrush body having a handle, a head, and a neck extending between the handle and the head, the head having an upper surface supporting a plurality of cleaning elements, the toothbrush body defining an internal cavity; a substrate within the internal cavity, the substrate defining an upper surface and a lower surface opposite the upper surface, a first end and a second end, wherein the first end is closer to the head and the second end is closer to the handle, the substrate including a contact arm extending from the substrate, the contact arm having a contact surface; a sensor contact spaced from the contact surface of the contact arm; a power source within the internal cavity; and a signal element on the toothbrush body; wherein a force on the upper surface of the head causes the substrate to flex from an unflexed state to a flexed state, and wherein the flexing of the substrate to the flexed state moves the contact surface of the contact arm toward the sensor contact, and upon the amount of the force reaching a predetermined threshold, the substrate is flexed to a threshold flexed state, wherein the contact surface contacts the sensor contact and completes an electrical connection between the sensor contact, the power source, the contact surface of the contact arm, and the signal element, thereby activating the signal element; wherein the contact arm is centrally disposed within an opening defined in the substrate.

9. The pressure sensing toothbrush of claim 8 wherein the upper surface of the contact arm is coplanar with the upper surface of the substrate when the substrate is in the unflexed state.

10. The pressure sensing toothbrush of claim 9 wherein the sensor contact is mounted to the upper surface of the substrate above the free end of the contact arm.

11. The pressure sensing toothbrush of claim 10 wherein the contact arm includes a plated contact pad that contacts the sensor contact when the substrate is in the threshold flexed position.

12. The pressure sensing toothbrush of claim 11 wherein the signal element is an LED, the LED being visible from the exterior of the toothbrush body.

13. The pressure sensing toothbrush of claim 12 wherein the LED is lit with a first color when the substrate is in the unflexed position, and the LED is lit with a second color when the substrate is flexed to the threshold position.

14. The pressure sensing toothbrush of claim 13 wherein the predetermined amount of threshold force required to move the substrate to the threshold flexed state is 250 g (g-force).

15. The pressure sensing toothbrush of claim 14 wherein the neck has a first end adjacent the head, and a second end adjacent the handle, the base end of the contact arm adjacent the first end of the neck, and the free end of the contact arm adjacent the second end of the neck.

16. A pressure sensor for a toothbrush, the toothbrush having a toothbrush body including a head, a handle, and a neck between the head and the handle, the toothbrush body defining an internal cavity extending through at least a portion of the handle and the neck, the pressure sensor comprising:

a printed circuit board disposed within the internal cavity, the printed circuit board including a contact arm having a base end connected to the printed circuit board and a free end opposite from the base end and unconnected to the remainder of the circuit board;

a power source within the internal cavity;

a signal element mounted on the circuit board and connected to the power source;

a sensor contact mounted on the circuit board adjacent to the free end of the contact arm;

wherein the printed circuit board is positioned such that a force on the head of the toothbrush in a first direction flexes the printed circuit board and moves the contact arm in an opposite direction between an unflexed position in which the contact arm is spaced from the sensor contact, and a flexed position in which the contact arm moves toward the sensor contact, and when the amount of the force on the head reaches a predetermined threshold, the contact arm is moved to a threshold flexed position in which the contact arm contacts the sensor contact to complete a circuit between the power source and the signal element to activate the signal element wherein the free end is spaced from the remainder of the substrate, the free end positioned adjacent to the sensor contact, wherein the free end is flexed and separates away from the remainder of the substrate to contact the sensor contact when the substrate is in the threshold flexed state.

17. The pressure sensor of claim 16 including a second sensor contact, the second sensor contact contacting the contact arm when the substrate is in the unflexed state, and the second sensor not contacting the contact arm when the substrate is in the flexed state, the signal element activated to produce a first signal when the contact arm contacts the second sensor contact, the signal element activated to produce a second signal when the contact arm is not in contact with either of the sensor contacts, and the signal element activated to produce a third signal when the substrate is in the threshold flexed state with the contact arm in contact with the sensor contact.

18. The pressure sensor of claim 16 wherein the contact arm is centrally disposed within an opening defined in the substrate.

19. The pressure sensor of claim 18 wherein the upper surface of the contact arm is coplanar with the upper surface of the substrate when the substrate is in the unflexed state.

20. The pressure sensor of claim 16 wherein the contact arm includes a plated contact pad that contacts the sensor contact when the substrate is in the threshold flexed position.

* * * * *